United States Patent [19]
Okamoto

[11] Patent Number: 5,885,313
[45] Date of Patent: Mar. 23, 1999

[54] TEMPERATURE-GRADIENT TYPE MULTISTAGE CONDENSER

[75] Inventor: Joji Okamoto, Kobe, Japan

[73] Assignee: Shionogi & Co., Ltd., Osaka, Japan

[21] Appl. No.: 919,498

[22] Filed: Aug. 28, 1997

[30] Foreign Application Priority Data

Sep. 12, 1996 [JP] Japan .................................. 8-241967

[51] Int. Cl.⁶ .................................................... B01D 8/00
[52] U.S. Cl. .................................. 55/315.2; 55/DIG. 15; 165/110; 165/111
[58] Field of Search ................................ 95/39, 288, 289; 55/315.1, 315.2, DIG. 15; 96/221, 377, 100, 160, 163, 164, 165; 165/110, 111; 62/434, 435

[56] References Cited

U.S. PATENT DOCUMENTS

| | | | |
|---|---|---|---|
| 1,641,660 | 9/1927 | Bryant | 165/110 |
| 2,125,910 | 8/1938 | Gardner | 55/DIG. 15 |
| 2,317,814 | 4/1943 | Schuchmann et al. | 165/110 |
| 2,425,669 | 8/1947 | Brock | 165/111 |
| 2,427,142 | 9/1947 | Hornbacher et al. | 165/111 |
| 2,465,229 | 3/1949 | Hipple, Jr. | 165/110 |
| 2,476,447 | 7/1949 | Berg | 165/111 |
| 2,513,114 | 6/1950 | Smith | 165/111 |
| 2,601,971 | 7/1952 | Todd | 165/111 |
| 2,647,823 | 8/1953 | Van Wessem et al. | 165/110 |
| 2,659,452 | 11/1953 | Gaydasch | 165/110 |
| 2,683,333 | 7/1954 | Canicoba | 165/111 |
| 2,818,656 | 1/1958 | Holleman | 55/DIG. 15 |
| 2,949,015 | 8/1960 | Fite | 55/DIG. 15 |
| 3,015,474 | 1/1962 | Dalin | 165/110 |
| 3,144,756 | 8/1964 | Arnold et al. | 55/DIG. 15 |
| 3,188,785 | 6/1965 | Butler | 55/DIG. 15 |
| 3,216,207 | 11/1965 | Boyer et al. | 165/110 |
| 4,333,523 | 6/1982 | Hartzler | 165/111 |
| 4,471,836 | 9/1984 | Hokanson | 165/111 |
| 5,033,541 | 7/1991 | D'Silva | 165/155 |
| 5,076,349 | 12/1991 | Kadono et al. | 165/111 |

FOREIGN PATENT DOCUMENTS

| | | | |
|---|---|---|---|
| 0 433 729 A1 | 6/1991 | European Pat. Off. | |
| 54-65163 | 5/1979 | Japan | 55/DIG. 15 |

*Primary Examiner*—Duane S. Smith
*Attorney, Agent, or Firm*—Sheridan Ross P.C.

[57] ABSTRACT

In the temperature-gradient type multistage condenser, a first cooling step is carried out at an outer cooling cylinder storing a freezing mixture. The outer cooling cylinder has an opening at the upper portion thereof and is constructed of double walls having a predetermined space between the walls, a second cooling step is carried out at a vertical pipe disposed substantially coaxially in the outer cooling cylinder, and a third cooling step is carried out at an inner cooling cylinder through which the vertical pipe passes. The cooling capacity is gradually increased as cooling proceeds from the first cooling step, and becomes substantially highest at the third cooling step wherein solvent vapor becomes thin.

8 Claims, 10 Drawing Sheets

TEMPERATURE-GRADIENT TYPE MULTISTAGE CONDENSER

BACKGROUND OF THE INVENTION

The present invention relates to a temperature-gradient type multistage condenser of a gas/liquid separator for separating solvent vapor having solutes into gas and liquid, and for recovering solvents. The solvent vapor to be separated has been produced by a rotary evaporator, a test tube sample concentrator or the like.

Recently, standards and regulations for discharge of various solvents used at research laboratories and the like have been strictly regulated and have also been tightened in many countries to protect environments. However, conventional gas/liquid separators had a low solvent recovering ratio and were unable to satisfy strict discharge standards. Therefore, at research laboratories and the like, so as to satisfy strict discharge regulations, a plurality of trapping apparatuses were required to be connected in series with a conventional gas/liquid separator so as to perform solvent recovery operations several times when recovering a solvent from solvent vapor.

In a conventional gas/liquid separator, solvent vapor generated from a rotary evaporator, a test-tube sample concentrator or the like is cooled by a dewar type condenser, a vertical type condenser or the like to perform gas/liquid separation. The dewar type condenser is used to recover non-solidifying solvents having low melting points, such as diethyl ether or dichloromethane. The vertical type condenser is used to recover solidifying solvents, such as benzene having a solidifying point of +5.5° C. Therefore, it was necessary to select an appropriate condenser depending on the kind of solvent when conventional solvent recovery was performed.

Furthermore, in conventional gas/liquid separators, solvent recovery cannot be performed completely. Therefore, it is preferable that a diaphragm type vacuum pump having TEFLON® (polytetrafluoroethylene) valves should be used as a vacuum source. However, since the diaphragm type vacuum pump having TEFLON® valves are expensive, they do not become widespread. In actual practice, water flow pumps have been used widely. This causes the problem of environmental pollution.

FIG. 11 is a system diagram showing a solvent recovery system comprising a conventional gas/liquid separator. The conventional gas/liquid separator shown in FIG. 11 is a rotary evaporator 100 comprising a dewar type condenser 101 shown in cross section. This rotary evaporator 100 is structured so that a sample flask 102 held at a holding portion 104 can be moved up and down by a jack. The sample flask 102 is immersed in a bath portion 103, and a sample in the sample flask 102 becomes solvent vapor. The solvent vapor is introduced into the dewar type condenser 101. The solvent vapor introduced from the bottom portion of the dewar type condenser 101 passes through the side wall passage of the dewar type condenser 101, and is discharged from an exhaust port 101a.

Dry ice or the like used as a freezing mixture is stored in the dewar type condenser 101. In the dewar type condenser 101, solvent vapor is liquefied and trapped in a receiving flask 105.

As shown in FIG. 11, three trapping apparatuses 110, 111, 112 are connected in series with the exhaust port 101a of the dewar type condenser 101. These trapping apparatuses have vacuum traps 110a, 111a, 112a, and dewar bottles 110b, 111b, 112b for trapping. The vacuum traps 110a, 111a, 112a are provided for evaporating a solvent from solvent vapor. The dewar bottles 110b, 111b, 112b are provided for cooling and maintaining the vacuum traps 110a, 111a, 112a, respectively at predetermined temperatures. In the trapping apparatuses 110, 111, 112, acetone and dry ice are used as a freezing mixture.

The exhaust port of the last trapping apparatus 112 is connected to an aspirator (water-jet pump) 114, which is used as a vacuum source, via a pressure gauge 113 and a T-shaped pipe. In addition, the T-shaped pipe is connected to a needle valve 116 via a leak valve 115.

As described above, in the conventional gas/liquid separator, the condenser of the gas/liquid separator must be selected depending on the kind of solvent to be recovered. Therefore, the solvent recovery requires very troublesome operations.

Furthermore, since the solvent recovery ratio attained by a single gas/liquid separator is low in the conventional gas/liquid separator, if an aspirator (water-jet pump) is used as a vacuum source, drain water may be contaminated. And if a diaphragm type vacuum pump with TEFLON® valves is used as a vacuum source, the environment in a laboratory may be harmed, thereby causing problems in safety.

Moreover, in order to satisfy strict discharge regulations and standards by using the conventional gas/liquid separator, a plurality of trapping apparatuses must be connected in series with the conventional gas/liquid separator, and a plurality of solvent recovery operations must be performed. Therefore, the conventional gas/liquid separator takes much more time and cost for solvent recovery, and requires a wide space for installing such a gas/liquid separator system.

Accordingly, an object of the present invention is to provide a temperature-gradient type multistage condenser having a high solvent recovery ratio and superior operability.

Another object of the present invention is to provide a temperature-gradient type multistage condenser capable of securely recovering various solvents by using a single gas/liquid separator and capable of satisfying strict discharge regulations.

A still another object of the present invention is to provide a gas/liquid separator having compatibility with the conventional gas/liquid separator and capable of greatly increasing the solvent recovery ratio attained by the conventional gas/liquid separator by replacing a part of the conventional gas/liquid separator with the temperature-gradient type multistage condenser of the present invention.

A still yet another object of the present invention is to provide a gas/liquid separator having an easy-to-produce structure which is produceable in a short time at cost much lower than that of the conventional gas/liquid separator.

BRIEF SUMMARY OF THE INVENTION

The temperature-gradient type multistage condenser of the present invention comprises:

a substantially cylindrical shape outer cooling cylinder for storing a freezing mixture, the outer cooling cylinder being formed to have an opening at the upper portion thereof, and having a double-walled side wall having a predetermined gap space between its outer wall and its inner wall, the gap space having a first inlet disposed at its lower end to allow solvent vapor to enter therefrom into the gap space and a first outlet disposed at its upper end to discharge the solvent vapor therefrom, a vertical pipe disposed substantially coaxially with the outer cooling cylinder and having a second inlet disposed at its upper end, said second inlet being for connection to the first outlet, and a second outlet disposed at its lower end for discharging the solvent vapor therethrough, an inner cooling cylinder disposed inside the outer cooling cylinder and outside the vertical pipe so that the vertical pipe passes through the inner cooling cylinder to form an inner cooling passage between the inner cooling cylinder and the vertical pipe, wherein the lower end of the inner cooling passage communicates with the inner wall of the outer cooling cylinder thereby to form a solvent reservoir, with such special relation that the second outlet of the vertical pipe is disposed in the solvent reservoir, and the upper end of the inner cooling passage defines a third outlet for discharging the solvent vapor, and a solvent discharge pipe formed at the bottom surface of the solvent reservoir so as to discharge condensed liquid formed in the solvent reservoir therefrom.

Because of the above-mentioned structure, the temperature-gradient type multistage condenser of the present invention has a multistage cooling mechanism having temperature gradients and can carry out gas/liquid separation at a high solvent recovery ratio.

The temperature-gradient type multistage condenser of the present invention comprises cooling means for performing a first cooling step in the outer cooling cylinder, a second cooling step in the vertical pipe, and a third cooling step in the inner cooling cylinder, wherein the cooling temperature at the third cooling step is substantially lower than those at the first and second cooling steps.

Therefore, the temperature-gradient type multistage condenser of the present invention offers desired temperature gradients by using a simple structure, and can have a superior solvent recovery ratio.

In the temperature-gradient type multistage condenser of the present invention, a plurality of narrow portions are formed on the inner cooling cylinder so that compression and expansion are repeated at the inner cooling passage. Therefore, the temperature-gradient type multistage condenser of the present invention can have a much higher solvent recovery ratio.

The temperature-gradient type multistage condenser of the present invention has the solvent discharge portion, and. has a tapered side face at a joint part to be connected to a solvent receiver. Therefore, the temperature-gradient type multistage condenser of the present invention can have compatibility with the conventional gas/liquid separator, and can easily increase the solvent recovery ratio attained by the conventional gas/liquid separator. The conventional separator can be modified so as to satisfy strict discharge standards.

In the temperature-gradient type multistage condenser of the present invention, the first inlet of the outer cooling cylinder is formed near the bottom face of the solvent reservoir. This structure of the temperature-gradient type multistage condenser of the present invention prevents sudden cooling of solvent vapor, and also prevents clogging of passage due to freezing of a solvent.

In the temperature-gradient type multistage condenser of the present invention, the outer cooling cylinder is wrapped with a heat insulation material. Therefore, the temperature-gradient type multistage condenser of the present invention can maintain a desired cooling temperature by using a simple structure, whereby production cost can be reduced.

In the temperature-gradient type multistage condenser of the present invention, the outer cooling cylinder, the vertical pipe and the inner cooling cylinder are substantially coaxial, and are rotation-symmetrical with respect to the axis of the outer cooling cylinder. Therefore, the temperature-gradient type multistage condenser of the present invention can be produced easily.

While the novel features of the invention are set forth particularly in the appended claims, the invention, both as to organization and content, will be better understood and appreciated, along with other objects and features thereof, from the following detailed description taken in conjunction with the drawings.

Figure 1:
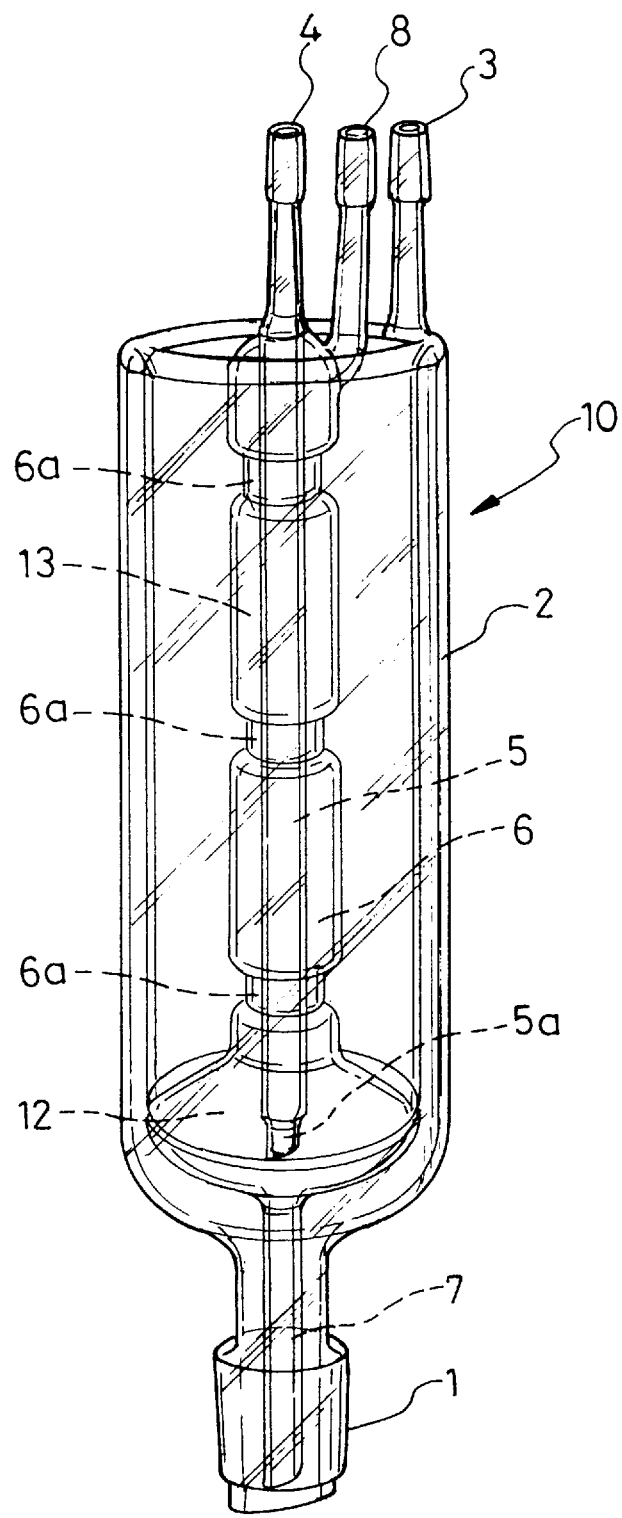
FIG. 1 is a perspective view showing a temperature-gradient type multistage condenser in accordance with a first embodiment of the gas/liquid separator of the present invention.

It will be recognized that some or all of the Figures are schematic representations for purposes of illustration and do not necessarily depict the actual relative sizes or locations of the elements shown.

DETAILED DESCRIPTION OF THE INVENTION

An embodiment of a temperature-gradient type multistage condenser in accordance with the present invention is described below referring to the drawings.

First Embodiment

Figure 2:
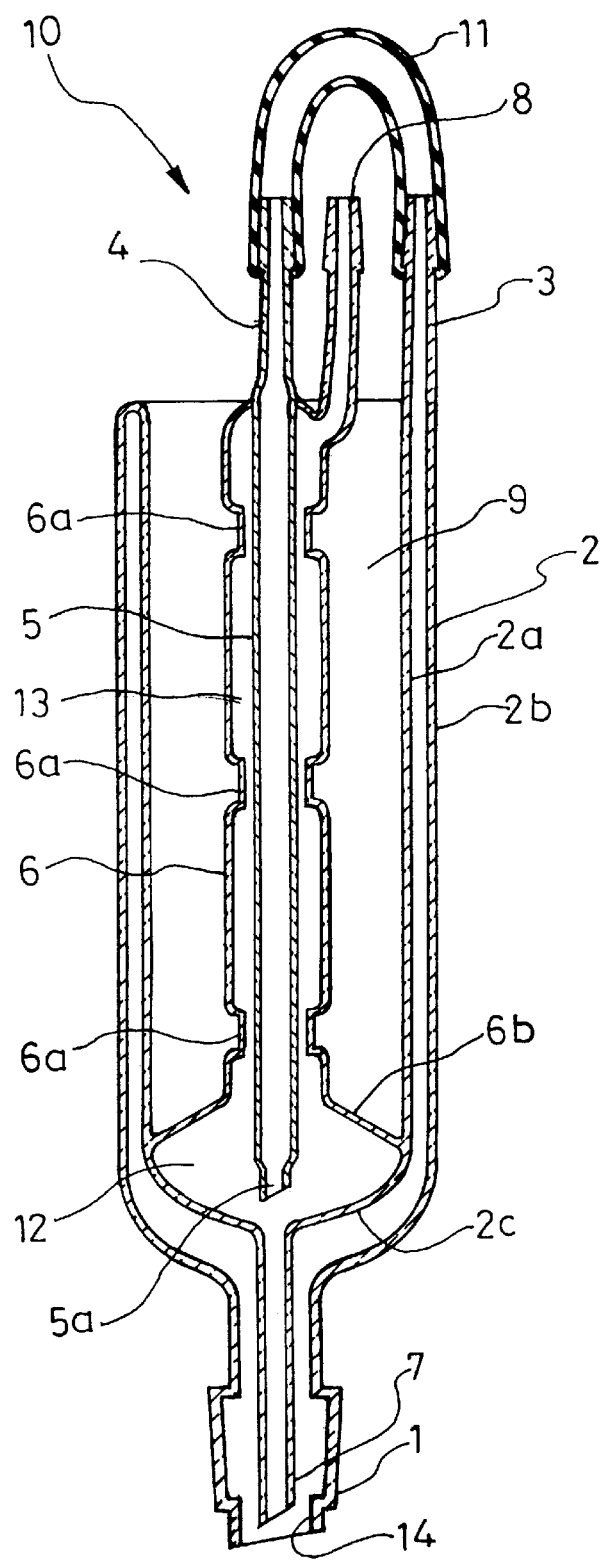
FIG. 2 is a sectional view showing a temperature-gradient type multistage condenser shown in FIG. 1.
Figure 3:
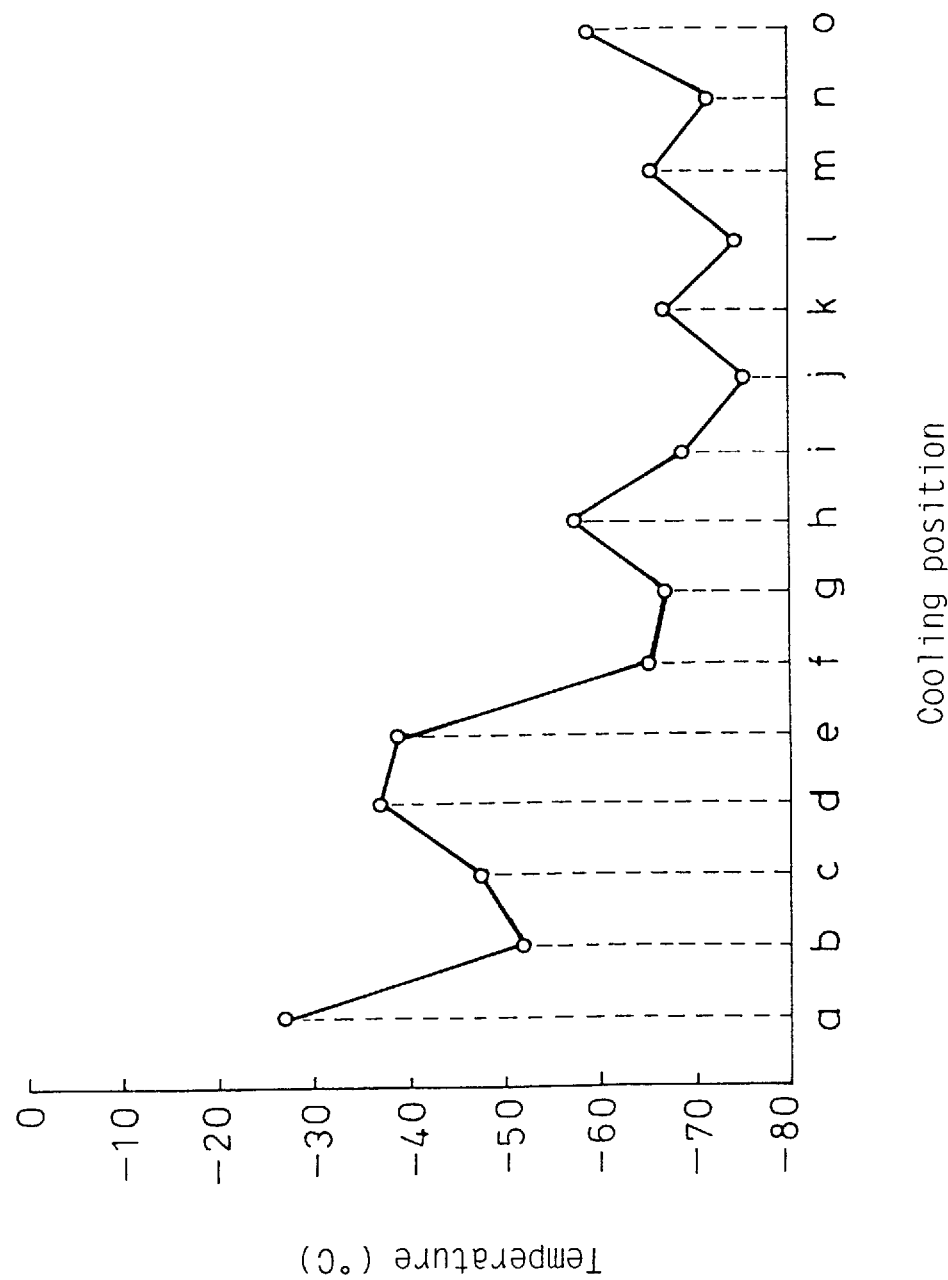
FIG. 3 is a graph showing cooling temperature gradients at various positions of a condenser in accordance with the first embodiment.
Figure 4:
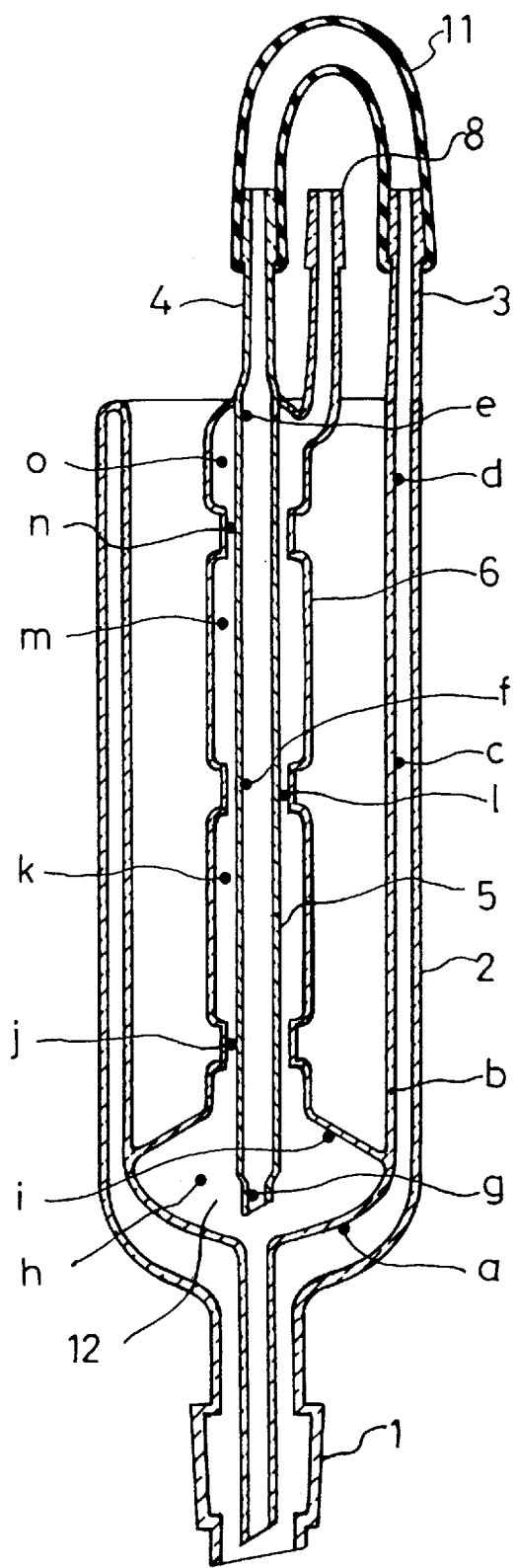
FIG. 4 is a side sectional view showing cooling temperature measurement positions shown in FIG. 3.
Figure 5:
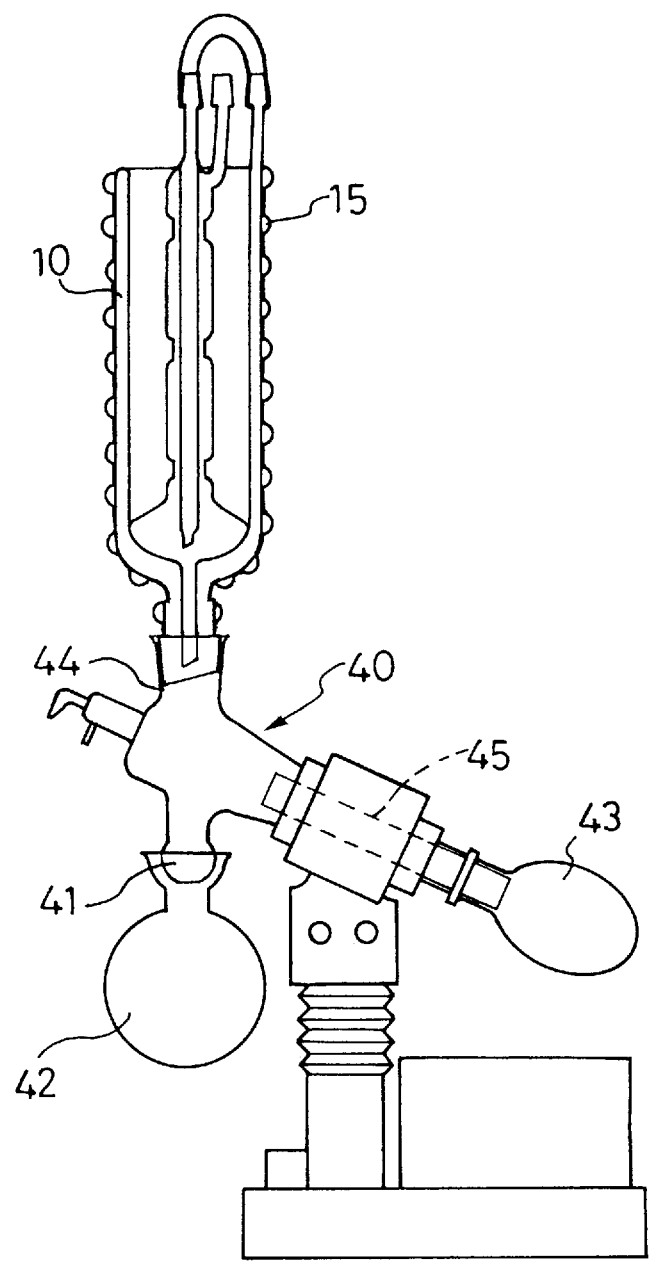
FIG. 5 is a partially cutaway side view of the condenser shown in FIG. 1 which is used for a rotary evaporator.

FIG. 1 is a perspective view showing a temperature-gradient type multistage condenser 10 (hereinafter simply referred to as "condenser") in accordance with a first embodiment of the gas/liquid separator of the present invention. FIG. 2 is a sectional side view showing the condenser 10 shown in FIG. 1. FIG. 3 is a graph showing cooling temperature gradients at various positions of the condenser 10 shown in FIG. 1. FIG. 4 is a side sectional view showing cooling temperature measurement positions shown in FIG. 3. FIG. 5 is a partially cutaway side view of a gas/liquid separator comprising the condenser 10 of FIG. 1, used as a rotary evaporator.

Structure of the condenser 10

As shown in FIGS. 1 and 2, the condenser 10 of the gas/liquid separator of the first embodiment is integrally formed with a transparent glass material, and arranged to have an opening at the upper portion thereof. The condenser 10 comprises an outer cooling cylinder 2 having a joint at the bottom thereof, an inner cooling cylinder 6 disposed inside the outer cooling cylinder 2, and a vertical pipe 5 passing through the inner cooling cylinder 6. The outer cooling cylinder 2, the vertical pipe 5 and the inner cooling cylinder 6 are disposed in the vertical direction so as to be substantially coaxial with one another.

The joint 1 having the solvent vapor inlet 14 (FIG. 2) of the condenser 10 has the same shape as that of the joint of a dewar type condenser or a vertical type condenser used for a conventional gas/liquid separator. In the first embodiment, the joint 1 has a shape having a taper of 45/40.

The inner cooling cylinder 6 disposed inside the outer cooling cylinder 2, through which the vertical pipe 5 passes, has three narrow portions 6a, 6a, 6a. The clearance between the inner wall of the inner cooling cylinder 6 and the outer wall of the vertical pipe 5 which is disposed in the inner cooling cylinder 6 is set at 2 mm at the narrow portions 6a. This clearance is about ⅕ of the clearance at other portions than the narrow portions 6a.

As shown FIGS. 1 and 2, an outer cooling cylinder outlet 3 is disposed at the upper end of the outer cooling cylinder 2. Furthermore, a vertical pipe inlet 4 is disposed at the upper end of the vertical pipe 5, and an inner cooling cylinder outlet 8 is disposed at the upper end of the inner cooling cylinder 6.

The outer cooling cylinder outlet 3 and the vertical pipe outlet 4 are connected to each other by using a flexible tube 11. Therefore, solvent vapor flowing from a solvent vapor inlet 14 disposed at the lower end of the outer cooling cylinder 2 passes the side interior of the outer cooling cylinder 2 and flows from the vertical pipe inlet 4 to the vertical pipe 5.

Solvent vapor flowing downward through the vertical pipe 5 flows from a vertical pipe outlet 5a into a solvent reservoir 12. The solvent reservoir 12 has a space formed by widening the lower end 6b of the inner cooling cylinder 6 so as to obtain a skirt shape and by connecting the lower end 6b to the bottom surface 2c of the inner wall of the outer cooling cylinder 2. Therefore, the inner bottom surface of the outer cooling cylinder 2 is closed by the solvent reservoir 12, and a freezing mixture is stored in a cooling space 9 formed between the outer cooling cylinder 2 and the inner cooling cylinder 6.

Solvent vapor in the solvent reservoir 12 moves upward through an inner cooling passage 13 having the three narrow portions 6a, 6a, 6a, and discharged from the inner cooling cylinder outlet 8 to the vacuum source. Coagulated liquid of remaining solvent vapor is trapped at this final cooling process wherein the solvent vapor moves upward through the inner cooling passage 13. A discharge port 7 from which the trapped coagulated liquid is discharged is disposed at the bottom surface of the solvent reservoir 12.

Vapor discharged from the inner cooling cylinder outlet 8 hardly includes liquefiable solvent components. Therefore, the condenser 10 of the first embodiment does not deliver solvent vapor to the vacuum source (such as an aspirator) in the form of gas.

The coagulated liquid trapped by the outer cooling cylinder 2 flows downward along the inner and outer wall surfaces 2a, 2b of the outer cooling cylinder 2, and drops into a liquid reserving flask used as a solvent receiver and connected to the joint 1.

In the first embodiment, pulverized dry ice is used solely as a freezing mixture, and the circumference of the condenser 10 is wrapped with a simple heat insulation material such as an air pack sheet or a urethane foam to ensure heat insulation. Acetone and dry ice are used for the conventional dewar type condenser as a freezing mixture. However, in our experiments, even when only pulverized dry ice is independently used for the condenser 10 of the first embodiment, the solvent recovery ratio attained by the condenser 10 of the first embodiment can be made higher than the recovery ratio attained by the conventional dewar type condenser.

Cooling temperature gradients at the condenser 10

The temperature-gradient type multistage condenser of the present invention is structured to perform multistage condensing by offering gradients to the condensing temperatures of solvent vapor.

FIG. 3 is a graph showing an example of cooling temperature gradients at the condenser 10 of the first embodiment. Referring to FIG. 3, the ordinate designates temperature [° C.], and the abscissa designates condensing positions (a to o) at the condenser 10. FIG. 4 is a side sectional view of the condenser 10 and shows a plurality of cooling positions (a to o) shown in FIG. 3. The temperatures shown in FIG. 3 were measured in a stationary condition (gas/liquid separation was not performed) about 30 minutes after pulverized dry ice used as a freezing mixture was supplied.

The graph shown in FIG. 3 shows changes in temperature at various positions from a position (a) near the solvent vapor inlet to the condenser outlet (o) of the inner cooling cylinder outlet 8. As shown in the graph of FIG. 3, at the first cooling step ranging from the position (a) near the solvent vapor inlet to a position (d) near the outer cooling cylinder outlet, the cooling temperature was in the range of about −30° to −50° C. At the second cooling step ranging from a position (e) near the vertical pipe inlet to the solvent reservoir (h), the cooling temperature was in the range of about −40° to −70° C. Furthermore, at the third cooling step, that is the final step, ranging from the ceiling (i) of the solvent reservoir 12 to a position (o) near the inner cooling cylinder outlet, the cooling temperature was in the range of about −65° to −75° C.

Therefore, in the first, second and third cooling steps, the condenser 10 of the first embodiment has a cooling temperature gradient which substantially lowers as the step proceeds from the first to third cooling step.

The cooling temperature gradient and the flow of solvent vapor are described below in detail.

As shown in FIG. 3, the cooling temperature is gradually lowered by dry ice used as a freezing mixture stored in the outer cooling cylinder 2 in the range from the position (a) near the solvent vapor inlet of the outer cooling cylinder 2. Since a position (b) near the bottom of the outer cooling cylinder 2 is directly cooled by dry ice via the inner wall surface of the outer cooling cylinder 2, the cooling temperature is lowered further. The cooling temperature at the intermediate position (c) of the outer cooling cylinder 2 is slightly higher than the temperature at the bottom (b). In addition, the cooling temperature at the outlet position (d) of the outer cooling cylinder 2 becomes higher since the surface layer of dry ice absorbs heat from the outside-air.

Since the position (a) near the solvent vapor inlet is not directly cooled by dry ice because of the existence of the solvent reservoir 12 as described above, the solvent is prevented from being frozen near this position.

Furthermore, at positions (e to g) in the vertical pipe, the cooling temperature is relatively high since dry ice used as a freezing mixture does not make direct contact with the positions. At the position (h) in the solvent reservoir, the cooling temperature rises temporarily.

Moreover, at positions (j to o) in the inner cooling passage of the inner cooling cylinder 6, the cooling temperature lowers abruptly at the three narrow portions (j, l, n). Besides, solvent vapor is compressed at the three narrow portions 6a, 6a, 6a of the inner cooling passage 13, and a supersaturated condition occurs repeatedly.

In this way, in the condenser 10 of the first embodiment, positions required to be cooled are cooled abruptly at multistages so as to effectively condense solvent vapor and to increase the ratio of solvent recovery.

In the first embodiment, solvent vapor is cooled at multistages by cooling temperatures having gradients. Solvent vapor is cooled most significantly at the final stage wherein solvent vapor becomes lean. Therefore, even a low boiling point solvent, such as diethyl ether, and a solidifying solvent which solidifies easily, such as chloroform or 1,2-dichloromethane, was able to be recovered at a ratio of nearly 100% in the case of a gas/liquid separator having the condenser 10 of the first embodiment. The results of this solvent recovery experiment are described later.

In addition, the condenser 10 of the first embodiment has the solvent reservoir 12 near the solvent vapor inlet. Therefore, the solvent reservoir 12 performs temperature buffering at the early stage of the cooling process. Therefore, even when a solvent to be treated is a solidifying solvent, the solvent does not solidify at the lower inner wall (position a in FIG. 4) of the outer cooling cylinder 2.

Furthermore, it is structured that solvent vapor supplied from the solvent vapor inlet 14 rises nearly vertically and linearly in the outer cooling cylinder 2 having low passage resistance. Consequently, the solvent in the outer cooling cylinder 2 does not freeze easily, the condenser 10 of the first embodiment has the high ratio of solvent recovery.

According to our experiment, at the cooling process of the outer cooling cylinder 2, 73 to 98% of solvent included in solvent vapor was liquefied and trapped.

Solvent vapor having passed the outer cooling cylinder 2 flows downward through the vertical pipe 5 and is introduced into the solvent reservoir 12. Since the vertical pipe 5 substantially has double walls, abrupt cooling is prevented. Therefore, even though an easily solidifying solution passes through the vertical pipe 5, the solvent does not solidify therein. Solvent vapor passing through the vertical pipe 5 becomes saturated in the narrow pipe, and introduced into the solvent reservoir 12 in a state of fine mist.

Since the solvent vapor having passed through the vertical pipe 5 is introduced into the solvent reservoir 12 having a capacity much larger than the capacity of the vertical pipe 5, the solvent vapor in the solvent reservoir 12 stays for a predetermined period. In this solvent reservoir 12, most of the solvent vapor is heat-exchanged and liquefied.

Moreover, solvent vapor not recovered at the solvent reservoir 12, that is, very lean residual solvent vapor, such as vapor of a low boiling point solvent, has the lowest cooling temperature at the cooling step of the condenser 10. Such solvent vapor thus slowly rises through the inner cooling passage 13 having the narrow portions 6a. Almost all the residual solvent vapor is liquefied in the inner cooling passage 13 and trapped. The solvent liquefied in the inner cooling passage 13 flows down in the solvent reservoir 12 and discharged from the discharge port 7 into the solvent receiver (not shown).

Gas/liquid separator using rotary evaporator

In the rotary evaporator shown in FIG. 5, a conventional vertical dewar type condenser is replaced with the condenser 10 of the first embodiment. In the rotary evaporator of the first embodiment, the joint 1 (joint size: 45/40 taper) is connected to the branch pipe 44 of a stationary adaptor 40 by sliding engagement, and the condenser 10 is held vertically by the stationary adaptor 40. Around the condenser 10, a simple heat insulation material 15, such as an air pack sheet or a urethane foam, is wound to insulate thermally the condenser 10.

As shown in FIG. 5, a sample flask 43 is connected by sliding engagement to a rotary joint 45 connected to the drive motor of the rotary evaporator. In addition, a liquid reservoir flask 42 used as a solvent receiver is connected to the ball joint 41 of the rotary evaporator.

In this way, a gas/liquid separator can be improved to have a high solvent recovery ratio by replacing the dewar type condenser of the conventional rotary evaporator with the condenser 10 of the first embodiment.

Method of producing the condenser 10

Next, a method of producing the condenser 10 of the first embodiment is described below.

Figure 6:
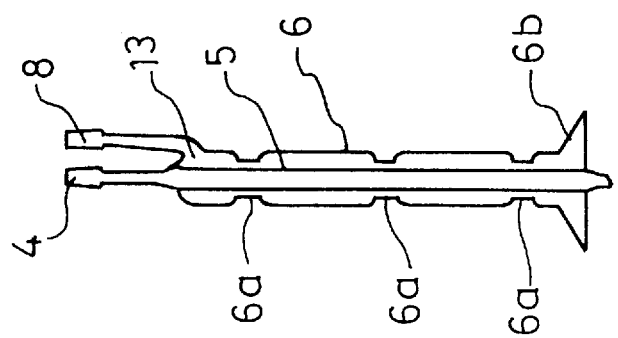
FIG. 6 is a schematic side view showing a production process for the inner cooling cylinder portion of the first embodiment.

An inner cooling cylinder portion is produced first. FIG. 6 is a schematic side view showing the production process of the inner cooling cylinder portion.

A glass pipe (35 mm in diameter in the case of the first embodiment) is secured to a lathe and a carbon jig having a desired shape is pressed against the heated glass pipe to form the plural narrow portions 6a. Next, the skirt-shaped bottom surface wall 6b of the inner cooling cylinder 6 is formed, and the peripheral portion (93 mm in diameter in the case of the present embodiment) thereof is used as a welding portion.

A thin pipe (15 mm in diameter in the case of the present embodiment) to be used as the vertical pipe 5 is inserted into the inner cooling cylinder having the narrow portions and the bottom surface wall 6b formed as described above, and the inserted pipe is secured at the upper portion thereof. A connection port, which is used as the vertical pipe inlet 4 and which is connected to a tube 11 (9 mm in inner diameter in the case of the present embodiment), is welded to the upper portion of the thin pipe of the vertical pipe 5. In addition, a connection port to be used as the inner cooling cylinder outlet 8 is welded to the upper end of the inner cooling passage 13 of the inner cooling cylinder portion.

Figure 7:
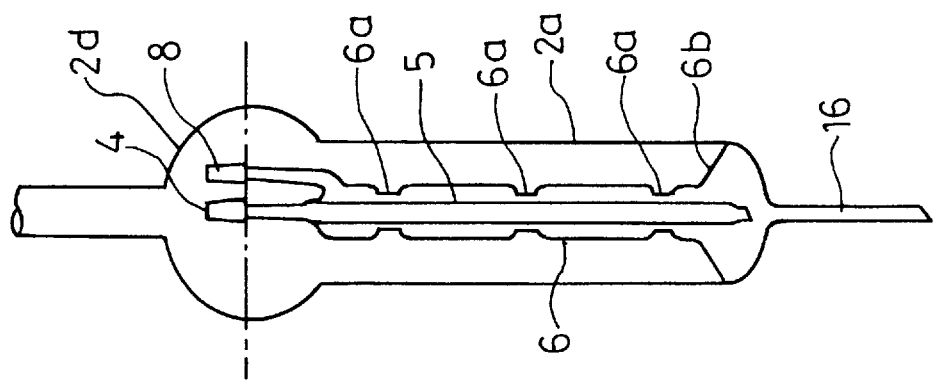
FIG. 7 is a schematic side view showing a production process of the outer cooling cylinder of the first embodiment.

Next, the outer cooling cylinder 2 is produced to store a freezing mixture. FIG. 7 is a schematic side view showing the production process of the outer cooling cylinder 2.

As shown in FIG. 7, the upper portion of the glass pipe (95 mm in diameter in the case of the present embodiment) used as the inner wall 2a of the outer cooling cylinder 2 is formed to have a spherical portion 2d having a diameter of about 110 mm. The spherical portion 2d is cut off at a position indicated by a chain line shown in FIG. 7. The inner cooling cylinder portion shown in FIG. 6 is inserted into the inner wall 2a of the outer cooling cylinder 2 formed as described above. The peripheral portion of the skirt-shaped bottom surface wall 6b is welded to the inner wall 2a of the outer cooling cylinder 2.

Next, a thin pipe (6 mm in diameter in the case of the present embodiment) is welded to the lower most portion of the bottom surface of the inner wall 2a of the outer cooling cylinder 2. Deflections are then removed from the inner wall 2a of the outer cooling cylinder 2 shown in FIG. 7 and other portions.

Furthermore, the spherical portion 2d, which is cut off at the position indicated by the chain line in FIG. 7, is cut to a desired shape, and expanded (to a diameter of 110 mm in the case of the present embodiment) so as to be welded to the outer wall 2b of the outer cooling cylinder 2 (FIG. 2).

Next, a glass pipe (110 mm in diameter in the case of the present embodiment) for an outer cylinder to be used as the outer wall 2b of the outer cooling cylinder 2 is shaped to a desired form, and a joint (joint size: 45/40 taper in the case of the present embodiment) is welded to the lower most portion of the bottom surface as shown in FIGS. 1 and 2. The shape of the joint 1 of FIG. 1 corresponds to the joint usually used for a generally used rotary evaporator so as to connect easily to a rotary evaporator.

The upper portion of the outer cylinder glass pipe welded to the joint 1 is welded to the welding portion of the inner wall 2a of FIG. 2 expanded as described above, and the outer cooling cylinder 2 having double walls is formed. A joint port to be used as the outer cooling cylinder outlet 3 is welded to the outer cooling cylinder 2 formed as described above.

The condenser 10 of the first embodiment is produced as described above, and has a shape as shown in FIG. 1. Although the condenser 10 of the first embodiment has a complicated shape at first glance, the condenser 10 can be produced by repeating simple production steps used for the above-mentioned production method. This production method is simple and does not require any special skills. Since the condenser 10 of the first embodiment can be produced easily in this way, the condenser 10 is highly suited for mass production, and the production cost can be reduced significantly.

Second Embodiment

Figure 8:
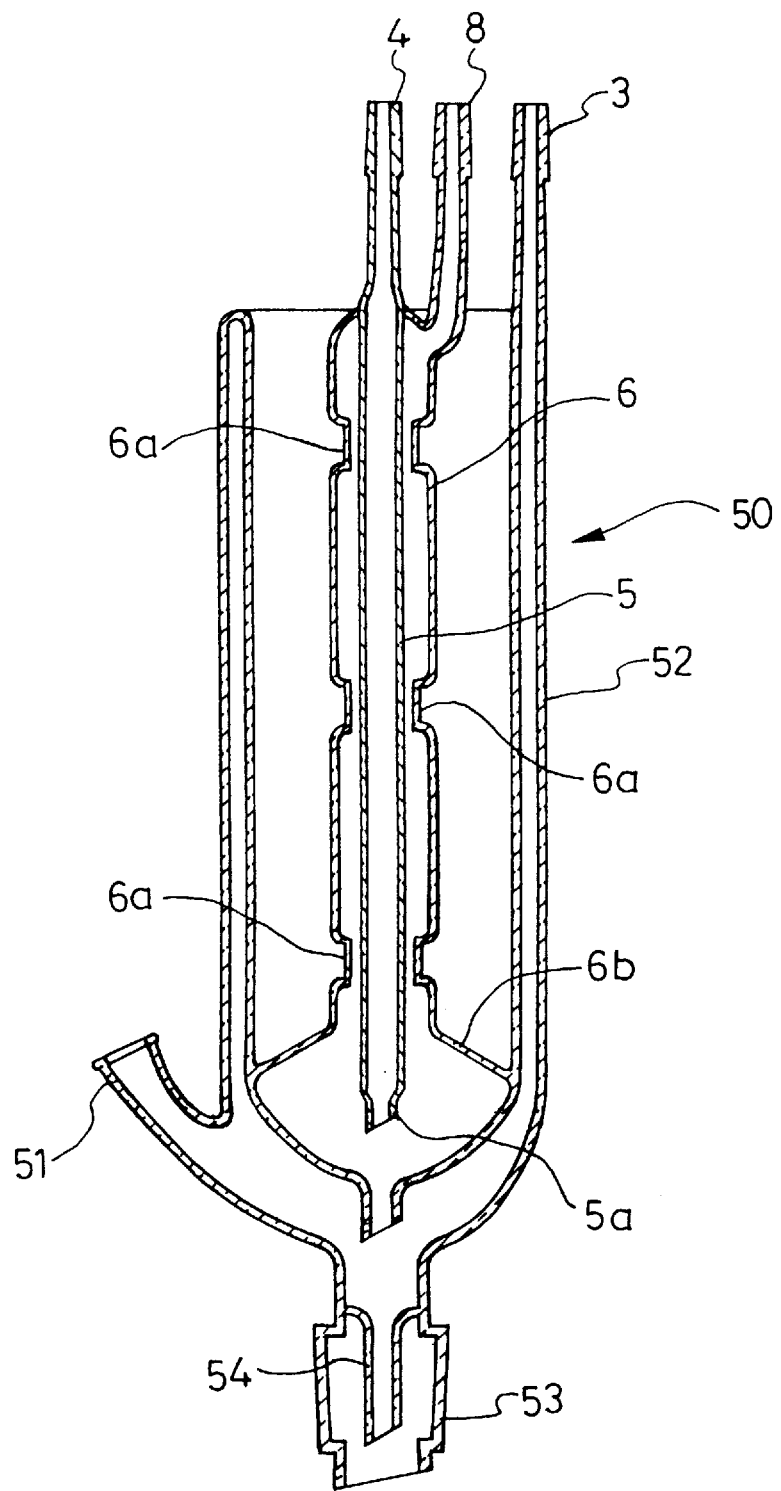
FIG. 8 is a sectional view showing a temperature-gradient type multistage condenser in accordance with a second embodiment of the gas/liquid separator of the present invention.
Figure 9:
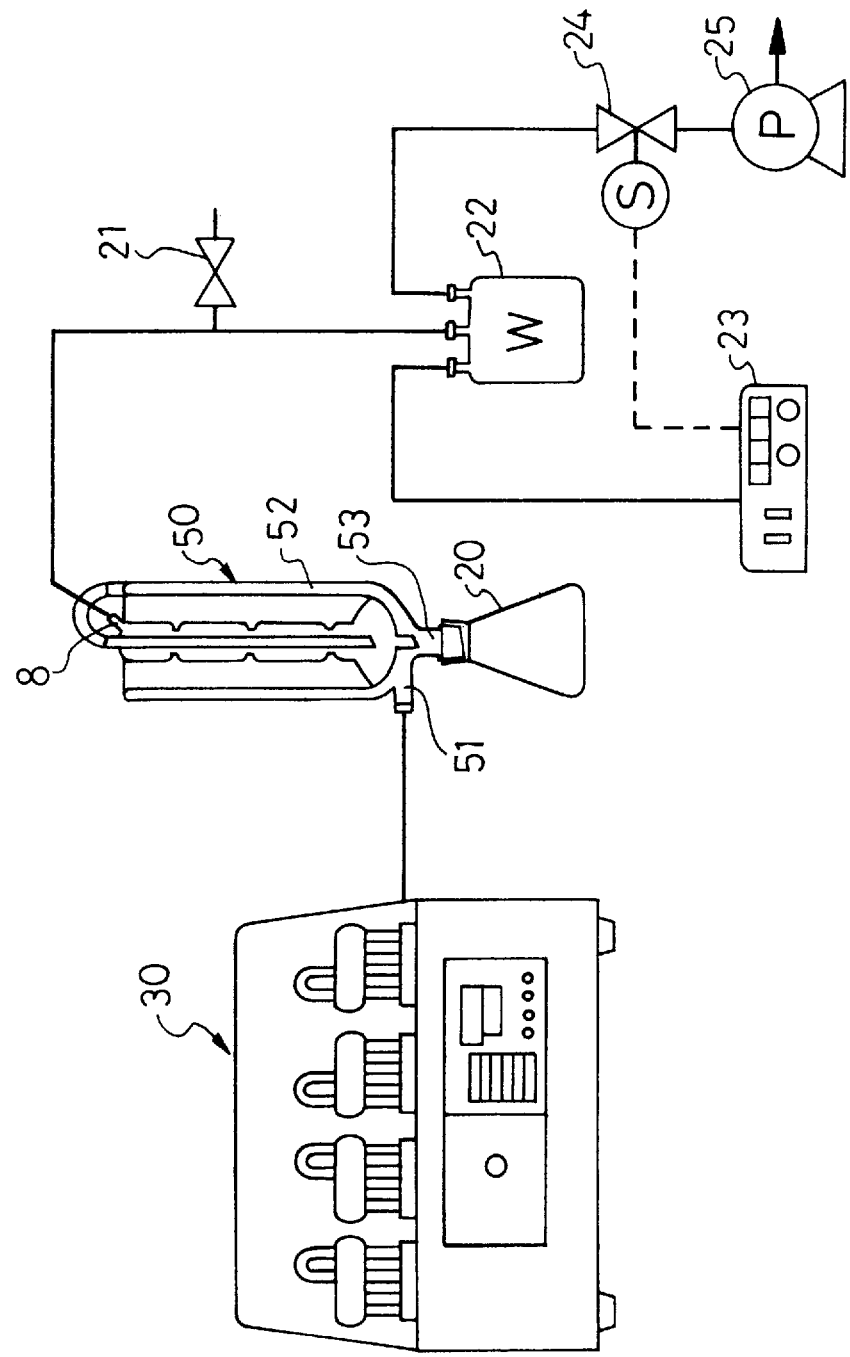
FIG. 9 is a system diagram showing a solvent recovery system using the temperature-gradient type multistage condenser of the second embodiment.

FIG. 8 is a side sectional view showing a temperature-gradient type multistage condenser 50 (hereinafter simply referred to as "condenser") of a gas/liquid separator in accordance with a second embodiment of the present invention. FIG. 9 is a system diagram showing a solvent recovery system using the condenser 50 of the second embodiment.

The condenser 50 used for the gas/liquid separator of the second embodiment is integrally formed with a transparent glass material just as in the case of the condenser 10 of the first embodiment. Components of the second embodiment having the same functions and structures as those of the components of the first embodiment are designated by the same reference codes, and their descriptions are omitted.

The condenser 50 of the second embodiment differs from that of the first embodiment in the following points. As shown in the vertical view of FIG. 8, a solvent vapor inlet 51 is disposed at the side lower portion of an outer cooling cylinder 52. A resistance pipe 54 (8 mm in diameter and 30 mm in length in the case of the present embodiment) is disposed in a joint 53 (joint size: 32/29 taper in the case of the present embodiment). The solvent vapor inlet 51 is connected to a simplified rotary evaporator, a test tube sample concentrator or the like, and used as a connection port into which solvent vapor is introduced. Accordingly, the joint 53 formed at the lower most portion of the bottom surface of the outer cooling cylinder 52 functions as the joint port to a receiving flask 20 or the like used as a solvent receiver shown in FIG. 9, not as the inlet of solvent vapor.

The resistance pipe 54 in the joint 53 prevents a solvent having been recovered once from evaporating again from the receiving flask 20, and from being introduced into the condenser 50.

Except the above-mentioned structure concerning the solvent vapor inlet 51 and the resistance pipe 54, the structure of the condenser 50 of the second embodiment is substantially the same as that of the condenser 10 of the first embodiment. In the gas/liquid separator comprising the condenser 50 of the second embodiment, solvent vapor is subjected to gas/liquid separation by the multistage cooling method. Solvent recovery can thus be carried out highly efficiently just as in the case of the aforementioned first embodiment.

FIG. 9 is a system diagram showing an example of a solvent vapor concentration system using the condenser 50 of the second embodiment.

As shown in FIG. 9, solvent vapor introduced from the test tube sample concentrator 30 is introduced into the solvent vapor inlet 51 of the condenser 50, and undergoes gas/liquid separation at the condenser 50 as described above. The inner cooling cylinder outlet 8 used as the vapor discharge outlet of the condenser 50 is connected to a Woulff buffer bottle 22 via a T-shaped pipe. In addition, a leak valve 21 is disposed at the branch pipe of the T-shaped pipe.

Besides, the Woulff buffer bottle 22 is connected to a TEFLON® diaphragm type vacuum pump 25 via a solenoid valve 24, and the interior of the suction system is maintained at a desired vacuum by a vacuum controller 23.

Comparison experiment of solvent recovery by gas/liquid separator

A solvent recovery comparison experiment was conducted by carrying out solvent recovery using a gas/liquid separator comprising the condenser 10 of the first embodiment, and by also carrying out solvent recovery using the conventional gas/liquid separator. In addition, solvent vapor discharged from each apparatus was subjected to secondary solvent recovery by using a gas/liquid separator comprising the condenser 50 of the second embodiment. The results of the above-mentioned solvent recovery comparison experiment are shown in TABLEs 1 and 2.

TABLE 1

| Type of gas/liquid separator | Name of solvent | Solvent evaporation conditions | | | Evaluated condenser | | Backup Secondary | | Total recovery ratio (%) |
|---|---|---|---|---|---|---|---|---|---|
| | | Treatment temperature (°C.) | Vacuum pressure (mmHg) | Evaporation time (min) | Recovery ratio (%) | R.S.D (%) | recovery ratio (%) | R.S.D (%) | |
| A | Diethyl ether | 35 | 150–430 | 5.0 | 99.8 | 0.1 | 0.0 | — | 99.8 |
| B | | 35 | 150–430 | 5.0 | 81.2 | 5.2 | 18.5 | 0.9 | 99.7 |
| A | Dichloro- | 30 | 90–380 | 9.5 | 99.8 | 0.3 | 0.0 | — | 99.8 |

TABLE 1-continued

| Type of gas/ liquid separator | Name of solvent | Solvent evaporation conditions | | | Evaluated condenser | | Backup Secondary | | Total recovery ratio (%) |
|---|---|---|---|---|---|---|---|---|---|
| | | Treatment temperature (°C.) | Vacuum pressure (mmHg) | Evaporation time (min) | Recovery ratio (%) | R.S.D (%) | recovery ratio (%) | R.S.D (%) | |
| B | methane | 30 | 90–380 | 9.5 | 73.1 | 6.6 | 26.6 | 0.3 | 99.7 |
| A | Chloroform | 40 | 60–330 | 7.5 | 99.9 | 1.0 | 0.0 | — | 99.9 |
| B | | 40 | 60–330 | 7.0 | 94.5 | 2.8 | 5.0 | 4.0 | 99.5 |
| A | 1,2- | 50 | 30–130 | 8.0 | 99.6 | 1.1 | 0.0 | — | 99.6 |
| B | dichloro-ethane | 50 | 30–130 | 8.0 | 95.6 | 2.3 | 3.9 | 10.2 | 99.5 |
| A | Aceto- | 30 | 30–150 | 10.0 | 100.0 | 0.1 | 0.0 | — | 100.0 |
| B | nitrile | 30 | 30–150 | 9.0 | 93.3 | 3.3 | 6.6 | 1.5 | 99.9 |
| A | n-hexane | 40 | 40–150 | 4.5 | 99.8 | 0.3 | 0.0 | — | 99.8 |
| B | | 40 | 40–150 | 4.5 | 86.9 | 3.4 | 12.8 | 1.6 | 99.7 |
| A | Acetone | 40 | 50–240 | 6.5 | 99.8 | 0.3 | 0.0 | — | 99.8 |
| B | | 40 | 50–240 | 6.5 | 82.8 | 12.0 | 17.2 | 0.6 | 100.0 |

TABLE 2

| Type of gas/ liquid separator | Name of solvent | Solvent evaporation conditions | | | Evaluated condenser | | Backup Secondary | | Total recovery ratio (%) |
|---|---|---|---|---|---|---|---|---|---|
| | | Treatment temperature (°C.) | Vacuum pressure (mmHg) | Evaporation time (min) | Recovery ratio (%) | R.S.D (%) | recovery ratio (%) | R.S.D (%) | |
| A | Methanol | 50 | 30–230 | 12.0 | 99.8 | 0.1 | 0.0 | — | 99.8 |
| B | | 50 | 30–230 | 12.0 | 83.7 | 9.2 | 16.1 | 0.6 | 99.8 |
| A | Ethanol | 50 | 10–130 | 12.0 | 99.7 | 0.1 | 0.0 | — | 99.7 |
| B | | 50 | 10–130 | 12.0 | 94.5 | 0.5 | 5.2 | 1.9 | 99.9 |
| A | Ethyl | 50 | 40–150 | 6.0 | 99.8 | 0.1 | 0.0 | — | 99.8 |
| B | acetate | 50 | 40–150 | 6.0 | 97.1 | 4.5 | 2.8 | 3.6 | 99.9 |
| A | 50% | 50 | 40–200 | 8.0 | 99.9 | 0.1 | 0.0 | — | 99.9 |
| B | benzene/ acetone | 50 | 40–200 | 8.0 | 88.7 | 2.6 | 11.2 | 0.9 | 99.9 |
| A | Water | 60 | 25–60 | 19.0 | 95.0 | 2.6 | 0.0 | — | 95.0 |
| B | | 60 | 25–60 | 19.0 | 99.8 | 2.3 | 0.0 | — | 99.8 |
| A | Water | 60 | 9–60 | 15.0 | 97.7 | 0.5 | 0.0 | — | 97.7 |
| B | | 60 | 9–60 | 15.0 | 95.9 | 1.9 | 2.8 | 74.0 | 98.7 |

TABLE 1 shows the experiments for separation into gas and liquid in the seven kinds of solvents, and TABLE 2 shows these in the six kinds of solvents. In TABLEs 1 and 2, gas/liquid separator A is shown as a gas/liquid separator wherein the condenser 10 of the first embodiment is mounted on a rotary evaporator. Besides, TABLES 1 and 2 show the results of secondary solvent recovery wherein solvent vapor discharged from the gas/liquid separator A is backed up by using the condenser 50 of the second embodiment.

Gas/liquid separator B performs solvent recovery by using a rotary evaporator comprising a conventional dewar condenser. Solvent vapor discharged from the gas/liquid separator B was subjected to secondary solvent recovery by using the condenser 50 of the second embodiment.

Figure 10:
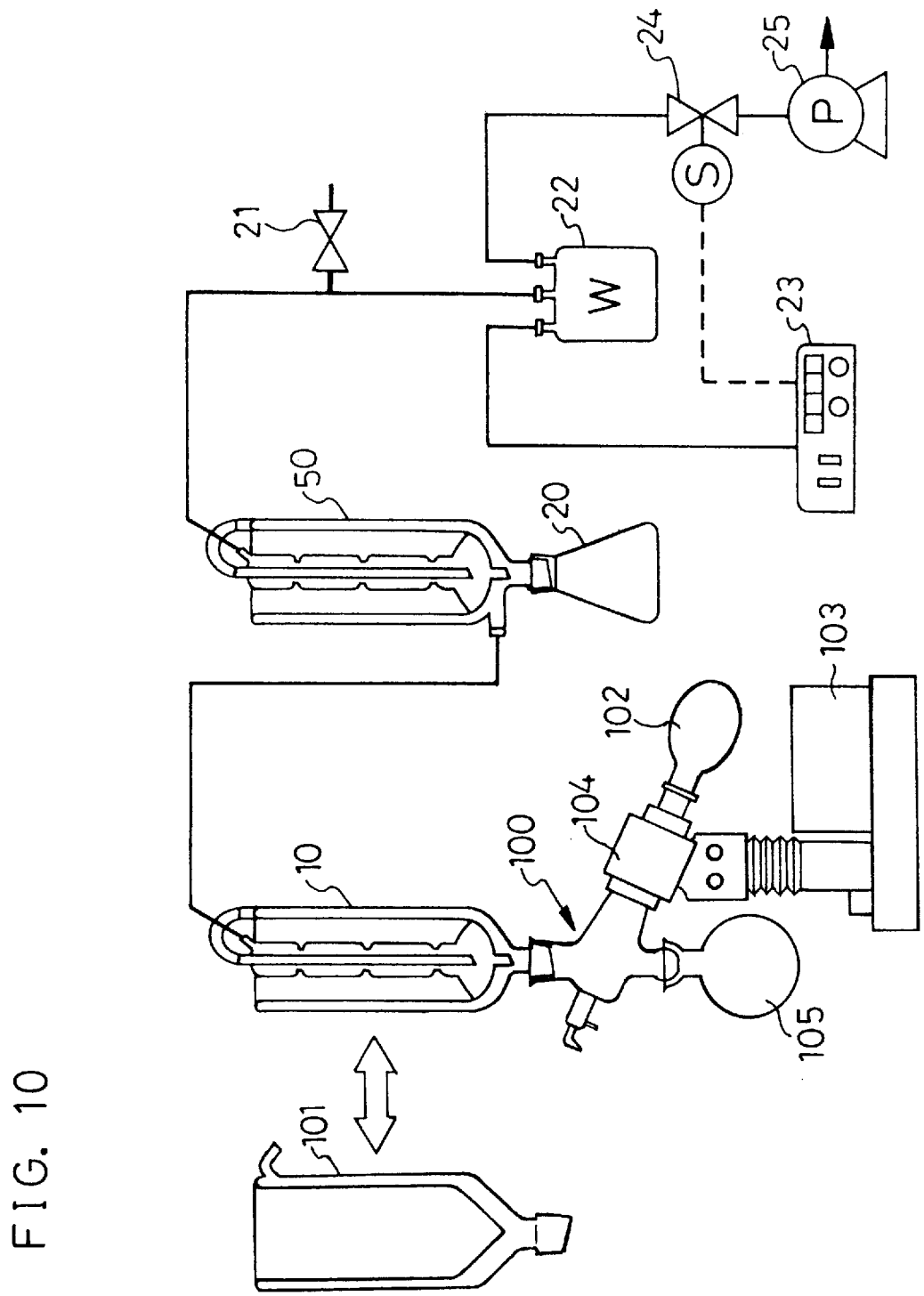
FIG. 10 is a system diagram showing an example of a solvent vapor concentration system using the temperature-gradient type multistage condenser of the second embodiment.
Figure 11:
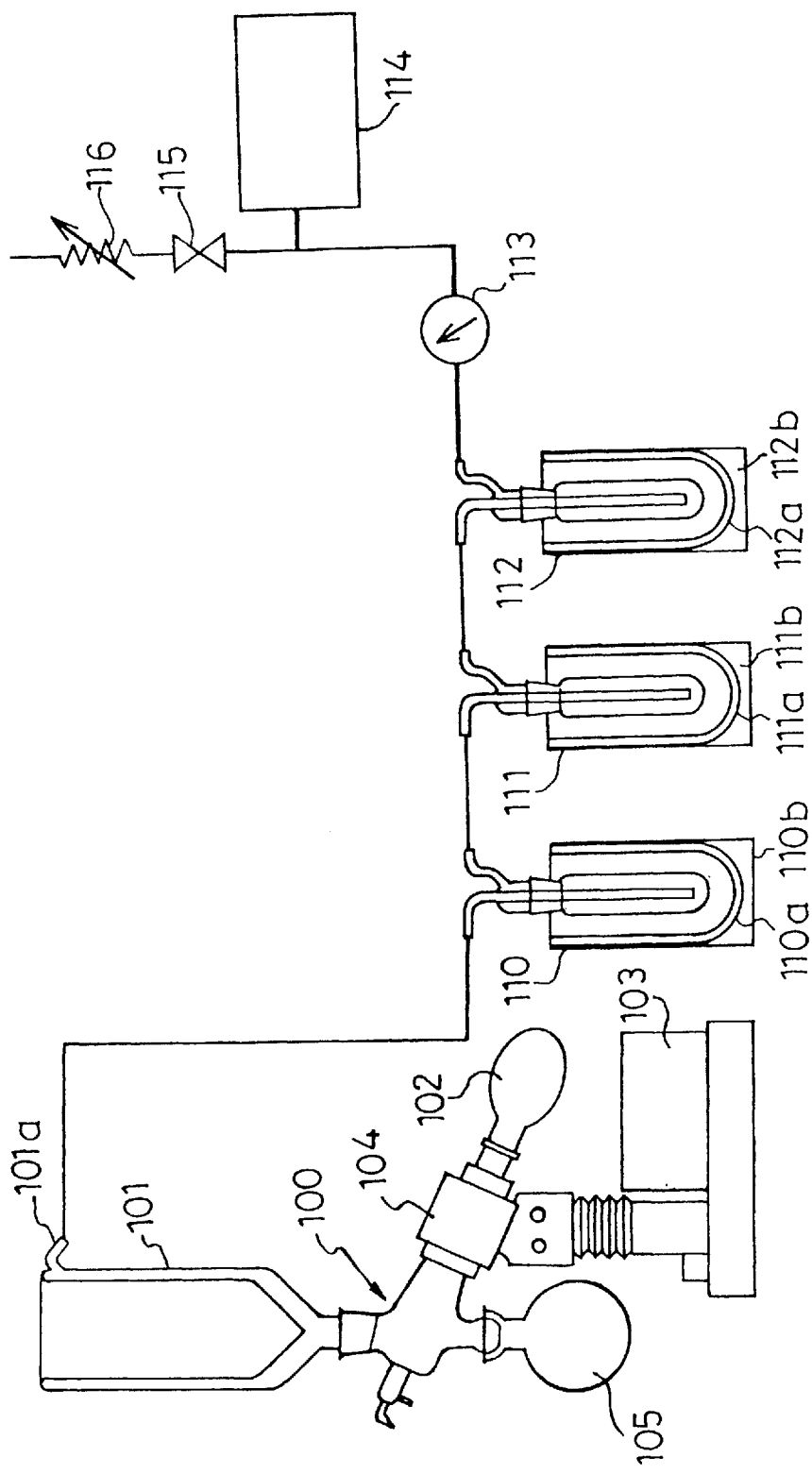
FIG. 11 is the system diagram showing the solvent recovery system using the conventional gas/liquid separator.

FIG. 10 is a system diagram showing a secondary solvent recovery system used for the above-mentioned solvent recovery comparison experiment. In FIG. 10, the components having the same functions and structures as those of the solvent vapor concentration system shown in FIG. 9 are designated by the same reference codes, and their descriptions are omitted.

The rotary evaporator used for the solvent recovery comparison experiment is Model RE121 made by Büchi LABORATORium STECHNiK AG, and the experiment was conducted at 200 rpm. Furthermore, the vacuum pump 25 used as a vacuum source is a TEFLON® diaphragm type vacuum pump, Model MZ2C (displacement: 28 L/min.) made by VACUUBRAND. The vacuum controller 23 is a vacuum controller, Model B161 made by Büchi LABORATORium STECHNiK AG. A bath portion 103 is a circulation type constant temperature bath, Model S1 made by MESSGERATE-WERK LAUDA. The Woulff buffer bottle 22 has a capacity of 1 liter.

In the above-mentioned solvent recovery comparison experiment, the capacity of each solvent to be treated is 300 mL (but, in the case of water, 150 mL). Only dry ice was used as the freezing mixture.

The recovery ratios [%] shown in TABLEs 1 and 2 were obtained by calculating the weight of each solvent recovered in the solvent receiver with respect to the weight of the solvent preliminary supplied. The average value of the results of experiments repeated three times was defined as a recovery ratio. Since part of a recovered solvent attaches to the interior of the condenser and remains, it is difficult to obtain the very exact recovery ratio. Therefore, in the solvent recovery comparison experiment, apparent recovery ratios were calculated on the basis of the amounts of recovered solvents obtained after two or three equilibration experiments in consideration of the amount of solvent remaining attached to the interior of the condenser.

As shown in TABLEs 1 and 2, even low boiling point solvents which were regarded to be very difficult to recover, such as diethyl ether, dichloromethane and the like were able to be recovered at a high recovery ratio of 99.8%, nearly 100%.

Furthermore, when benzene having a solidifying point of +5.5° C. was treated by the condenser of the gas/liquid separator of the present invention, if the treatment was carried out after denaturation conducted by adding an amount of acetone equivalent to benzene to the benzene sample, solidifying phenomena were hardly recognized in the condenser. As a result, a denatured solvent was trapped at a high recovery ratio of nearly 100%.

Moreover, even in the case of solidifying solvents such as chloroform, 1,2-dichloromethane, acetonitrile and the like, solidifying phenomena were hardly recognized in the condenser, and the problem of clogging passages was not caused at all. These solidifying solvents were recovered at a high recovery ratio of nearly 100%. This is because the condenser of the present invention has a temperature-gradient type multistage condensing mechanism. This mechanism functions so that cooling is carried out gradually in the early cooling period wherein the amount of solvent vapor is abundant, accordingly cooling in the intermediate cooling period is carried out more strongly than in the early cooling period, and so that cooling is carried out most strongly in the final cooling period wherein the amount of solvent vapor is scarce.

Moreover, a solvent which can not be recovered by a conventional rotary evaporator was recovered securely by a rotary evaporator comprising the condenser 50 of the second embodiment, after gas/liquid separation was carried out by the conventional rotary evaporator.

Besides, as shown in TABLEs 1 and 2, the relative standard deviation (RSD) of the gas/liquid separator A is far smaller than that of the conventional gas/liquid separator B. In other words, by using the condenser of the present invention, it can be understood that stable solvent recovery having no variations can be carried out at a constant recovery ratio at all times, even when operation conditions are changed somewhat.

As described above, the condenser of the present invention having a very simple structure can attain a high recovery ratio which cannot be attained by the conventional gas/liquid separator. In the conventional gas/liquid separator, multistages of gas/liquid separators were used to satisfy very strict discharge standards. In the case of the present invention, however, it is possible to satisfy rigorous discharge standards by using a single gas/liquid separator.

As described above, in the temperature-gradient type multistage condenser of the present invention, multistage cooling is carried out effectively by offering gradients to cooling temperatures. Therefore, very high solvent recovery ratios can be attained regardless of the type of solvents, that is, low boiling point solvents or solidifying solvents. Accordingly, in the case of the present invention, even when an aspirator (water-jet pump) is used for pressure reduction means, adverse effects to drain water contamination can be eliminated. Hence, it is possible to obtain a temperature-gradient type multistage condenser capable of ensuring superior safety.

Furthermore, the temperature-gradient type multistage condenser of the present invention comprises a condenser which can be produced easily, and thereby the production cost for the gas/liquid separator can be reduced significantly, and it is possible to obtain a gas/liquid separator suited for mass-production.

Moreover, the temperature-gradient type multistage condenser of the present invention has a joint identical to that of a dewar type condenser or the like used for a conventional gas/liquid separator, and also has an external appearance nearly similar to that of the dewar type condenser. Therefore, the conventional gas/liquid separator can be easily remodeled to an apparatus having a high recovery ratio by simply replacing the conventional dewar type condenser with the condenser of the present invention.

Besides, in the temperature-gradient type multistage condenser of the present invention, cooling is carried out stepwise by offering gradients to cooling temperatures in a plurality of cooling steps, and strongest cooling is carried out at the final stage wherein solvent vapor is lean. Therefore, low boiling point solvents such as diethyl ether and solidifying solvents such as chloroform can be recovered at a high recovery ratio of nearly 100%.

What is more, in the temperature-gradient type multistage condenser of the present invention, a solvent reservoir is provided so as to be used in the cooling step, and a solvent vapor inlet is formed near the solvent reservoir. Therefore, in the temperature-gradient type multistage condenser of the present invention, the solvent reservoir offers a temperature buffer function. Consequently, even solidifying solvents can be prevented from solidifying even in the early cooling period, whereby the ratio of solvent recovery can be increased.

Additionally, in the temperature-gradient type multistage condenser of the present invention, by wrapping the outer cooling cylinder with a heat insulation material having a simple structure, condensation of moisture in the air or attaching of frost to the surface of the outer cooling cylinder can be prevented. The heat insulation effect on the outer surface of the outer cooling cylinder can be increased, thereby reducing consumption of amount of a freezing mixture. Besides, a desired cooling temperature is maintained and a high recovery ratio can be obtained by using the above-mentioned simple structure, and therefore, the production cost of the gas/liquid separator of the present invention can be reduced significantly.

Furthermore, in the temperature-gradient type multistage condenser of the present invention, the outer cooling cylinder, the vertical pipe and the inner cooling cylinder are substantially coaxial, and are bilaterally symmetrical with respect to the axis. Therefore, the production steps for the condenser can be simplified, and the condenser is highly suited for mass production.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

I claim:

1. A cooling trap multistage condenser comprising:
   a substantially cylindrical shape outer cooling cylinder for storing a freezing mixture, said outer cooling cylinder being formed to have an opening at the upper portion thereof, and having a double-walled side wall having a predetermined gap space between its outer wall and its inner wall, said gap space having a first inlet disposed at its lower end to allow solvent vapor to enter therefrom into said gap space and a first outlet disposed at its upper end to discharge the solvent vapor therefrom,
   a vertical pipe disposed substantially coaxially with said outer cooling cylinder and having a second inlet disposed at its upper end, said second inlet being for connection to said first outlet, and a second outlet disposed at its lower end for discharging the solvent vapor therethrough,
   an inner cooling cylinder disposed inside said outer cooling cylinder and outside said vertical pipe so that said vertical pipe passes through said inner cooling cylinder to form an inner cooling passage between said inner cooling cylinder and said vertical pipe, wherein the lower end of said inner cooling passage communicates with the inner wall of said outer cooling cylinder thereby to form a solvent reservoir, with such special relation that said second outlet of said vertical pipe is disposed in said solvent reservoir, and the upper end of the inner cooling passage defines a third outlet for discharging the solvent vapor, and
   a solvent discharge pipe formed at the bottom surface of said solvent reservoir so as to discharge condensed liquid formed in said solvent reservoir therefrom.

2. A cooling trap multistage condenser in accordance with claim 1, comprising cooling means for performing a first cooling step in said outer cooling cylinder, a second cooling step in said vertical pipe, and a third cooling step in said inner cooling cylinder,
   wherein the cooling temperature at said third cooling step is substantially lower than those at said first and second cooling steps.

3. A cooling trap multistage condenser in accordance with claim 1, wherein a plurality of narrow portions are formed on said inner cooling cylinder so that compression and expansion are repeated at said inner cooling passage.

4. A cooling trap multistage condenser in accordance with claim 1, wherein said solvent discharge portion has a tapered side face at a joint part to be connected to a solvent receiver.

5. A cooling trap multistage condenser in accordance with claim 1, wherein said first inlet of said outer cooling cylinder is formed near the bottom face of said solvent reservoir.

6. A cooling trap multistage condenser in accordance with claim 1, wherein said outer cooling cylinder is wrapped with a heat insulation material.

7. A cooling trap multistage condenser in accordance with claim 1, wherein said outer cooling cylinder, said vertical pipe and said inner cooling cylinder are substantially coaxial, and are rotation-symmetric with respect to the axis of said outer cooling cylinder.

8. A gas/liquid separator comprising:
   solvent vapor generator for generating solvent vapor including solutes,
   a cooling trap multistage condenser into which solvent vapor from said solvent vapor generator is introduced,
   a solvent receiver for trapping condensed liquid from said cooling trap multistage condenser, and
   vacuum unit for making and maintaining a desired vacuum in a system formed by connecting said solvent vapor generator, said cooling trap multistage condenser and said solvent receiver,
   wherein said cooling trap multistage condenser comprises:
      a substantially cylindrical shape outer cooling cylinder for storing a freezing mixture, said outer cooling cylinder being formed to have an opening at the upper portion thereof, and having a double-walled side wall having a predetermined gap space between its outer wall and its inner wall, said gap space having a first inlet disposed at its lower end to allow the solvent vapor to enter therefrom into said gap space and a first outlet disposed at its upper end to discharge the solvent vapor therefrom,
      a vertical pipe disposed substantially coaxially with said outer cooling cylinder and having a second inlet disposed at its upper end, said second inlet being for connection to said first outlet, and a second outlet disposed at its lower end for discharging the solvent vapor therethrough,
      an inner cooling cylinder disposed inside said outer cooling cylinder and outside said vertical pipe so that said vertical pipe passes through said inner cooling cylinder to form an inner cooling passage between said inner cooling cylinder and said vertical pipe, wherein the lower end of said inner cooling passage communicates with the inner wall of said outer cooling cylinder thereby to form a solvent reservoir, with such special relation that said second outlet of said vertical pipe is disposed in said solvent reservoir, and the upper end of the inner cooling passage defines a third outlet for discharging the solvent vapor, and
   a solvent discharge pipe formed at the bottom surface of said solvent reservoir so as to discharge condensed liquid formed in said solvent reservoir therefrom.

* * * * *